United States Patent
Newberger

(10) Patent No.: US 10,520,395 B2
(45) Date of Patent: Dec. 31, 2019

(54) TEST STANDS FOR ELECTRIC MOTOR TO BE CONNECTED TO FRONT END ACCESSORY DRIVE OF INTERNAL COMBUSTION ENGINE

(71) Applicant: HORIBA Instruments Incorporated, Irvine, CA (US)

(72) Inventor: Norman Malcolm Newberger, White Lake, MI (US)

(73) Assignee: HORIBA Instruments Incorporated, Irvine, CA (US)

( * ) Notice: Subject to any disclaimer, the term of this patent is extended or adjusted under 35 U.S.C. 154(b) by 391 days.

(21) Appl. No.: 15/239,487

(22) Filed: Aug. 17, 2016

(65) Prior Publication Data

US 2018/0052078 A1 Feb. 22, 2018

(51) Int. Cl.
G01M 15/05 (2006.01)

(52) U.S. Cl.
CPC .................. *G01M 15/05* (2013.01)

(58) Field of Classification Search
CPC .. G01M 15/05; G01M 17/007; Y02T 10/6204
USPC .......................................... 73/115.05, 116.05
See application file for complete search history.

(56) References Cited

U.S. PATENT DOCUMENTS

| | | | |
|---|---|---|---|
| 5,432,418 A * | 7/1995 | Jeanneret | B60L 50/51 318/34 |
| 6,212,945 B1 | 4/2001 | Moskwa | |
| 6,612,163 B2 | 9/2003 | Kamiyama et al. | |
| 6,708,557 B2 | 3/2004 | Moskwa et al. | |
| 7,124,021 B2 | 10/2006 | Moskwa et al. | |
| 7,275,426 B2 | 10/2007 | Lahti et al. | |
| 7,506,537 B2 | 3/2009 | Moskwa et al. | |
| 9,873,435 B2 * | 1/2018 | Miller | B60W 10/06 |

(Continued)

FOREIGN PATENT DOCUMENTS

| | | | |
|---|---|---|---|
| CN | 102680248 A | * | 9/2012 |
| CN | 103344442 A | * | 10/2013 |
| CN | 203350046 U | * | 12/2013 |

(Continued)

OTHER PUBLICATIONS

Bryce Johnson et al., Testing Electrified Drivetrains for Vehicles Without the Battery or Engine, Readout, English Edition No. 38, Feb. 2011, 12 pgs.

(Continued)

*Primary Examiner* — Peter J Macchiarolo
*Assistant Examiner* — Irving A Campbell
(74) *Attorney, Agent, or Firm* — Brooks Kushman P.C.

(57) ABSTRACT

A dynamometer system includes a prime mover dynamometer and a gearbox. The prime mover dynamometer includes a primary output configured to be coupled to a drivetrain that represents a portion of a vehicle powertrain, a secondary output having a fixed speed relationship with the primary output, and a controller. The gearbox is coupled to the secondary output and configured to be coupled to an electric motor. The controller alters a speed and torque of the outputs based on a calculated speed and torque associated with a simulated internal combustion engine that represents another portion of the vehicle powertrain to impart speed oscillations into the electric motor and to impart torque oscillations into the drivetrain.

11 Claims, 5 Drawing Sheets

(56) References Cited

U.S. PATENT DOCUMENTS

2011/0252877 A1* 10/2011 Barnes .................. G01M 15/02
73/116.05
2015/0142341 A1* 5/2015 Akiyama ............ G01M 13/025
702/41

FOREIGN PATENT DOCUMENTS

CN         203719894 U  *  7/2014
WO      2013087244 A1    6/2013

OTHER PUBLICATIONS

Horiba, Road Load Simulation, Technical Specification, Version dated Mar. 1, 2008, 28 pgs.
J.J. Moskwa et al., Single Cylinder Engine Transient Test System, TRID database, Mar. 9, 2006, 2 pgs.

* cited by examiner

TEST STANDS FOR ELECTRIC MOTOR TO BE CONNECTED TO FRONT END ACCESSORY DRIVE OF INTERNAL COMBUSTION ENGINE

TECHNICAL FIELD

This disclosure relates to the testing of electric motors to be connected to the accessory drives of internal combustion engines used in certain alternatively powered vehicles, and to the testing of internal combustion engines of certain conventionally powered vehicles.

BACKGROUND

Alternatively powered vehicles include the hybrid electric vehicle (HEV) and battery electric vehicle (BEV). Both the series hybrid and BEV have 100% of propulsion energy coming from electricity. The series hybrid uses an internal combustion engine (ICE) to power a generator that produces electricity. The parallel hybrid powers the vehicle by a mechanical combination of electric motors and an ICE. In all cases, the drivetrain needs an electric motor, a traction battery and an auxiliary method of obtaining electricity. These auxiliary power units (APUs) are typically a downsized, highly efficient ICE or fuel cell for a zero emissions alternative.

Alternatively powered vehicles also have a powertrain subsystem that allows for the recuperation of vehicle kinetic energy during braking events, such as decelerating or maintaining speed when going downhill, and for reuse during a future torque demanding event, such as accelerating, maintaining speed going uphill, or powering auxiliary loads.

SUMMARY

A dynamometer system comprises a prime mover dynamometer including a primary output configured to be coupled to a drivetrain that represents a portion of a vehicle powertrain, a secondary output having a fixed speed relationship with the primary output, and a controller. The system further comprises a gearbox coupled to the secondary output and configured to be coupled to an electric motor. The controller is programmed to alter a speed and torque of the outputs based on a calculated speed and torque associated with a simulated internal combustion engine representing another portion of the vehicle powertrain to impart speed oscillations into the electric motor and to impart torque oscillations into the drivetrain.

A dynamometer system comprises a prime mover dynamometer including a primary output, a secondary output having a fixed speed relationship with the primary output and configured to be coupled to a single cylinder research engine (SCRE), and a controller. The system further comprises a gearbox coupled to the primary output and configured to be coupled to an electric motor. The controller is programmed to alter a speed and torque of the outputs based on a speed and torque of the SCRE to impart speed oscillations into the electric motor and to impart torque oscillations into the SCRE indicative of operation of a multi-cylinder engine.

A dynamometer system comprises a loading dynamometer, and a gearbox including low and high speed shafts. The low speed shaft is drivably coupled to an output of the loading dynamometer and configured to be drivably coupled to an internal combustion engine. The high speed shaft is configured to be drivably coupled to an electric motor.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments.

As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Historically, the verification, validation and controller calibration of vehicles was brought in from the proving grounds to the laboratory using chassis dynamometers simulating the road. The difficulty with such arrangements is that the entire vehicle needs to have all its intended components in a pre-production state. By expanding the simulation capabilities of the dynamometer controller to include simulation of missing subsystems not under development, subsystem or component testing can occur anywhere a dynamometer can be conveniently connected. In certain scenarios, a vehicle's kinematic characteristics, tires, differential, transmission, and torque converter are simulated for their power flow to result in torque or speed set points to a dynamometer attached to an internal combustion engine (ICE) crankshaft output. This configuration, however, suffers form the lack of availability of the ICE and battery pack intended for the vehicle. Both are high value, sophisticated subsystems undergoing their own development process involving different parts of the organization and supplier network. Electric motors (e-motors) are also being considered at other locations in the drivetrain. They can be located in the wheels, differential, transmission, or front end accessory drive (FEAD) in addition to the end of the crankshaft. These various alternatives add to the complexity of integration and calibration for the vehicle, thus requiring very early testing in the development process. The power of the battery pack can be simulated by controlling the voltage and current output of a high power, programmable DC to DC converter using a real time model of the battery chemistry. Additionally, the torque output of the ICE can be simulated by a real time model of the ICE combustion process and mechanical configuration.

Figure 1:
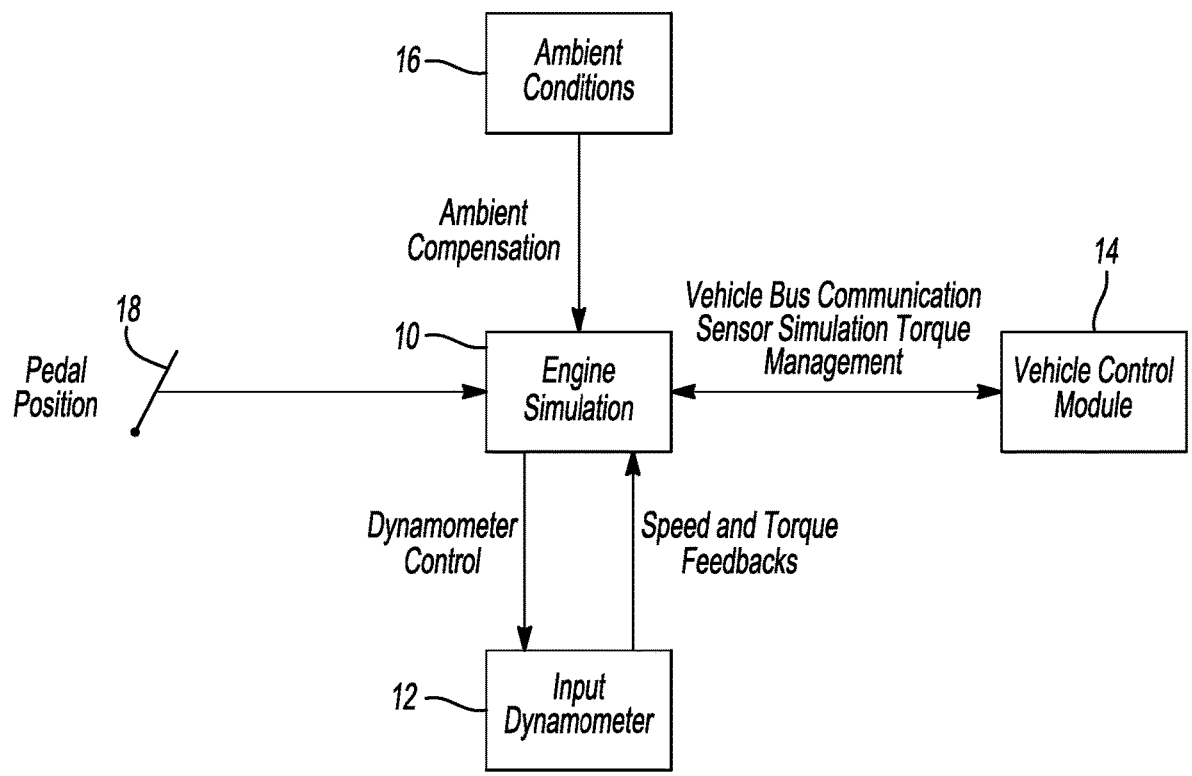
FIG. 1 is a block diagram of an engine simulation used to mimic behavior of an internal combustion engine's operating point torque, speed and throttle to duplicate torque oscillations of the combustion process.

With reference to FIG. 1, an engine simulation 10 controls an input dynamometer 12. The engine simulation 10 provides sensor and data communication inputs to a vehicle control module 14 to mimic being connected to a real engine. The engine simulation 10 is influenced by ambient conditions 16 (simulated or measured in the test cell) such as atmospheric pressure. Pedal position 18 controls engine demand torque for driving a vehicle.

The engine simulation 10, in this example, includes maps, an engine controller, a parametric model similar to the mechanical engine, and an adaptive mechanism. The engine controller controls cranking (start and stop), idling, and torque reduction during a gear shift. It also simulates the various engine/engine control unit (ECU) delays. A parametric engine model calculates torque due to the kinematics of the parts (pistons, connecting rod, crankshaft, and flywheel) and gas pressures. An adaptive mechanism assures that the response torque amplitude follows the demand amplitude. It also provides a means to limit frequencies and orders.

The engine simulation 10 also provides inertia simulation, throttle and pedal map simulation, torque reduction during shift, ECU torque management interventions, engine cranking, engine idle control, ignition simulation, coast simulation, fuel cut and closed throttle simulation, engine torque pulse simulation (ETPS) from the combustion process, cylinder firing reduction, front end accessory and generator loading, and ambient condition adjustment. ETPS includes simulation of fuel type (gasoline, diesel) and boost (turbocharged, super charged or normally aspirated). Two and four cycle engines are supported from 1 to 16 cylinders.

Current generation engine technology uses fly-by-wire throttle control. This imposes additional simulation responsibility on the engine simulation 10 to reproduce the demand from the "gas" pedal to throttle demand in the engine simulation 10. Typically, this requires a set of maps found in the ECU to interpret pedal demand into throttle position. The throttle position is then sent to an engine map to create the proper engine torque output. Pedal mapping is highly dependent on vehicle calibration.

An engine is typically throttle controlled. Based on the throttle setting and the current engine speed, the engine will produce a given torque. On the other hand, a dynamometer is speed or torque controlled. Unlike an engine, the electric dynamometer can produce maximum torque at zero speed. As a result, some method is required in the engine simulation 10 to limit the dynamometer torque to the average torque that the engine would produce and to create the throttle-to-torque function to mimic the engine. An engine torque map simulation provides this capability. A throttle demand sent to the engine simulation 10 is used along with the dynamometer's measured speed to determine the torque that the engine simulation 10 should produce. Since many vehicles are now "fly-by-wire," ECU implementations also provide additional mapping to map the pedal position to an internal throttle or torque demand. This additional pedal mapping may be a function of vehicle speed, battery state of charge, and other parameters as the vehicle controller calibration deems appropriate.

Drivetrain testing requires that the engine inertia is correct so that the load on the transmission is equivalent between the real engine and the dynamometer performing the engine simulation. Often, the dynamometer inertia is larger than the engine inertia, so compensation (inertia simulation) is required. A combination of engine speed observers and feed forwards allow a robust implementation of the dynamometer torque ($T_{el}$) needed to simulate the inertia of the engine and its flywheel. This torque is added to the torque from the torque map simulation:

$$T_{el} = \frac{J_{el} + J_{FW}}{J_{sim} + J_{FW}} T_{eng} + \left(1 - \frac{J_{el} + J_{FW}}{J_{sim} + J_{FW}}\right) T_{trans} = K * T_{eng} + (1-K) T_{trans}$$

where $T_{el}$ is the torque produced by the input dynamometer, $J_{el}$ is the inertia of the input dynamometer rotor plus shaft hub/coupling, $J_{FW}$ is the real engine flywheel (or part of the torque converter fixed to the crankshaft), $J_{sim}$ is the inertia of the engine being simulated (including the front rotating attachments and reciprocating elements), $T_{trans}$ is the torque from the transmission to move trans is the vehicle, K is a tunable constant, and $T_{eng}$ is the torque from the engine map (adjusted for all ambient conditions).

Hybrid electric vehicle (HEV) drivetrains require a battery or a battery simulator to test the electric motor. The battery simulator may include a power source to supply DC power and the software to simulate battery conditions and control the supply of voltage and current from the power source. Interface cabinets connect the power source to the customer specific HEV electric motor controller.

Demand for power, current, voltage, or power plus additional current can be used to simulate battery operating modes. The battery simulator simulates realistic battery output current, output voltage, power, state of charge, pack temperature, cell/module temperature difference, power limit, pack resistance, and capacity. Battery pack life (new, 5 years old, 10 years old) is simulated by adjustments to capacity and slew rates.

Alternators/generators associated with ICEs are taking on new functions as the automobile industry looks to increase fuel economy by electrification of the powertrain. The trend is to create a class of e-motors used in the vehicle that are driven by the accessory side of the ICE. This e-motor can generate the low voltage power to replenish the low voltage battery and supply motoring power to the ICE for starting the engine and torque augmentation in a variety of driving events. This class of e-motors has been referred to as belt starter generators (BSGs), torque assist reversing alternators (TARAs), and belt alternator starters (BASs).

Although the distinctive characteristic of the BSG/TARA/BAS e-motor is that it is driven by the accessory side of the ICE, not the crankshaft output, it is still subject to high frequency angular acceleration from the combustion process in the ICE. With an end use condition of constantly changing operating speed and high angular accelerations, the development and calibration of the electric control unit for the BSG/TARA/BAS has been broken down into two steps. First, is the characterization and motor development using a steady state speed device such as an electric dynamometer. Second, is calibration and durability testing on the specific target ICE for the BSG/TARA/BAS. This has made the deployment of BSG/TARA/BAS inefficient and costly for several reasons: a) availability of the target engines is limited, b) the dynamic environment of vehicle road cycles is required for product validation, and c) dynamometers capable of high speed (>12000 RPM) or high frequency angular acceleration (>20,000 RPM/sec) are not common.

Small e-motors used in BSG/TARA/BAS applications that define, for example, mild and micro hybrid vehicles can be tested through the entire development process on a single dynamometer test stand. By replacing the function of the belt drive found on the FEAD of the ICE with a gearbox for example, the rotational speed relative to engine speed is created. Other mechanical arrangements, such as belts, chains, combinations thereof, etc., can also be used. As such, the term "gearbox" may also contemplate these arrangements in some circumstances. The gearbox can be fixed ratio or variable ratio but for the balance of this discussion, fixed ratio is discussed. The dynamometer, in one example, is electric with 4 quadrant operation and power greater than or equal to the vehicle engine power. The dynamometer should be of a low inertia type with high overload torque capability to produce angular accelerations of greater than 20,000 RPM with frequency content greater than 400 Hz, and should have at least 8,000 RPM top speed to represent speeds of most ICEs using gasoline or diesel fuels.

The gearbox is powered by one of the dynamometers' shaft extensions and a vehicle transmission is powered by the opposite end dynamometer shaft extension. This simulates all the external connections to the crankshaft of the real engine. The electrical load to the BSG/TARA/BAS can be one of a real battery, a programmable DC power supply, or a DC power supply running a battery model. The transmission is loaded with an output dynamometer. This represents all the steady state and dynamic loads the BSG/TARA/BAS will experience in a vehicle application.

Steady state and basic characterization can be done with the transmission in neutral or disconnected. Zero speed and position control on the dynamometer allow full current characterization of the BSG/TARA/BAS with the rotor in a fixed and known position. Basic motor controls of the BSG/TARA/BAS are developed with the dynamometer in speed control and requesting the power controls to deliver current. Refinement and calibration of the controls is performed with the dynamometer simulating the ICE. Finally, vehicle level calibration for road cycle conditions is performed with the dynamometer simulating the ICE and transmission loading dynamometer simulating vehicle road loads.

By using an electric dynamometer (virtual engine) in combination with a gearbox, the complete angular acceleration environment at the correct high speed (typically 2 to 3 times engine speed) can be created along with the crankshaft output torque needed for the vehicle driveline. The gearbox provides the equivalent speed increase by providing a gear ratio similar to the pulley ratio in an ICE front end accessory belt drive. Additional benefits may include superior controllability of the dynamometer when the operating speed (of the simulated ICE) is kept below the top speed of the constant power region, the attached inertia to the BSG/TARA/BAS is reduced by reflecting the dynamometer inertia by the inverse of the ratio squared, the angular accelerations produced by the natural frequency of the belt drive and tensioner of a real FEAD do not confound angular acceleration from the simulated ICE, reliable torque transfer (no belt slip, or belt stretch due to age, or belt heat sensitivity for losses), and reduced maintenance (no belt, or tensioner replacement).

The angular acceleration seen by the BSG/TARA/BAS is caused by the engine firing torque pulses due to combustion, the engine piston configuration, and combustion (firing) order. These can be simulated by the dynamometer with an appropriate real time model integrated with the closed loop control of torque. Additionally, the engine speed can be simulated as input to the creation of these torque pulses even when the dynamometer actual speed is different than the simulated engine speed because the pulley ratio of the target engine is not the same as the gear box ratio. In this way, combustion order angular accelerations are at the correct frequency as the target engine, and the BSG/TARA/BAS can operate at the corresponding speed of the target engine.

For calibration of the BSG/TARA/BAS electronic power unit, the dynamometer should be double ended. The ETPS, in this arrangement, can appear as crankshaft torque to the transmission on one shaft end and as angular acceleration of the FEAD for the BSG/TARA/BAS. Torque from the BSG/TARA/BAS is summed to the dynamometer torque through the gearbox. Modern vehicle electronics often have multiple controllers as software running on one computational unit. Thus realistic transmission signals, simulated engine signals, and real BSG/TARA/BAS signals are available simultaneously in the calibration process. Loads to the transmission can be steady state, dynamic with vehicle road load simulation and driving cycles, or transient with replay and correction of data captured in the field. (Transmission function can be simulated with a different loading dynamometer or by the prime mover dynamometer.)

For studies involving a single cylinder research engine (SCRE), the gearbox allows the BSG/TARA/BAS to be connected to the SCRE via a gear box ratio, and the dynamometer can simulate the torsional environment of the missing cylinders in the engine simulation. The ETPS, however, may need a frequency domain correcting algorithm based on torque measurement and only act at firing orders to account for combustion in the SCRE and operating state of the engine (speed and load). Moreover, the dynamometer engine simulation should simulate the torque, speed, and pressure map of the target engine and its inertia.

When testing for dynamic response and calibration, the ICE does not offer an opportunity to measure actual torque at the BSG/TARA/BAS device. Only estimates based on current (amps) can be made. However, with a gearbox there is the opportunity to fit a high speed torque meter to measure torque. These torque meters can have a measurement bandwidth up to 5 kHZ so the measured torque can separate out all potential sources by analysis in the frequency domain. This is useful to separate gearbox gear mesh torque noise from the torque the BSG/TARA/BAS device is producing.

The virtual engine software can alter the torque output of the simulated engine based on effects of temperature, humidity and barometric pressure. This simplifies the requirements for a climate chamber to enclose only the BSG/TARA/BAS device. If barometric pressure is not in the scope of testing, the chamber could be eliminated and the fluid conditioning systems servicing the BSG/TARA/BAS device can simulate the net effective cooling to the e-motor and power electronics. This would be done in coordination with the engine simulation.

A gearbox is used to emulate pulley ratio for a variety of reasons. Pulleys and belts for ratio change usually have a resonance in the speed range of interest. Often this is mitigated by a tensioner so the belt does not break. Gearbox gear stiffness is so high that resonance is out of the speed range of interest. (Dynamometers usually have higher inertia than the ICE, so belt resonance would be lower in operational speed.) Typically, non-toothed belts are used on ICE FEADs. During development, torques may accidently be introduced that cause slip or damage to the belt. Gearboxes are designed to have a torque transfer margin well beyond the magnitude of the BSG/TARA/BAS short-circuit or fault torque. Speed, torque and position data from the instrumented gearbox is more reliable that the resolver or power sine wave frequency from the BSG/TARA/BAS device. This allows testing without final BSG/TARA/BAS integrated measurements for production to be defined. Also, these measurements serve as a plausibility check to the outputs of the BSG/TARA/BAS control unit. The gearbox allows the power of the BSG/TARA/BAS device to increase in future products up to the power typically used in traction motors or the engine being simulated.

Figure 2:
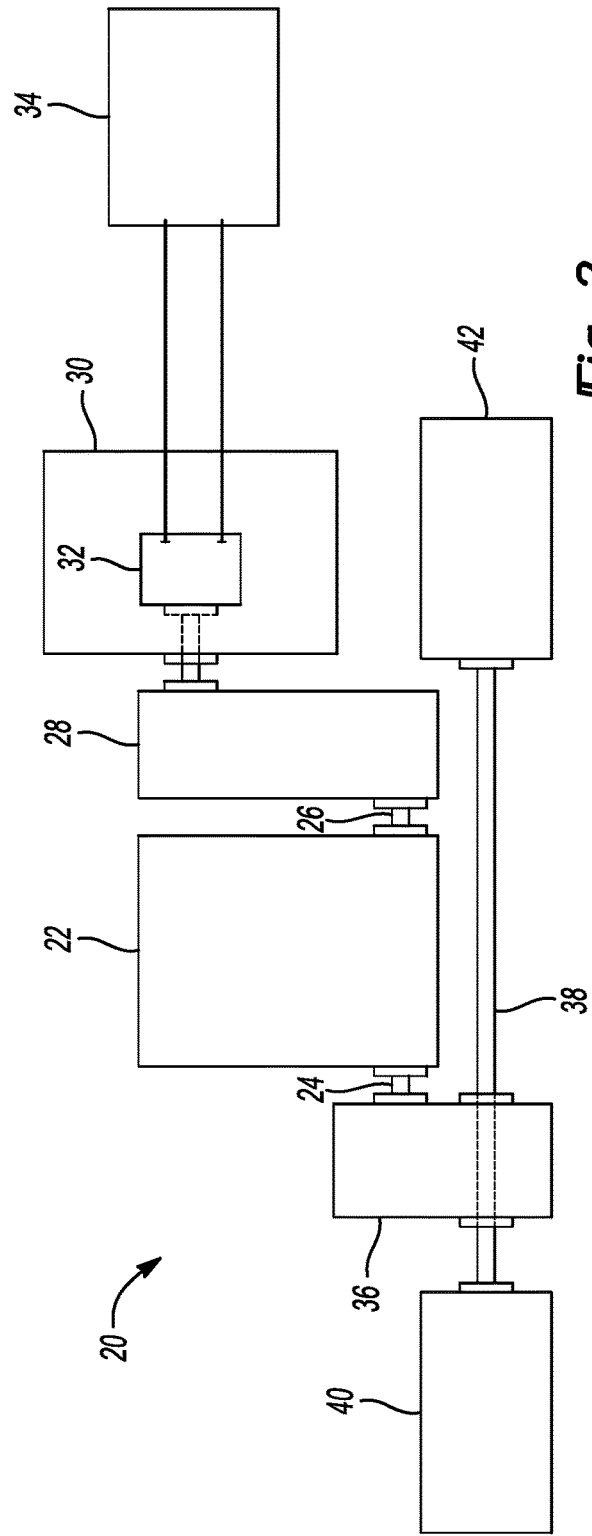
FIG. 2 is a schematic diagram of a test stand for belt starter generator (BSG)/torque assist reversing alternator (TARA)/belt alternator starter (BAS) development.

With reference to FIG. 2, an example test stand 20 for BSG/TARA/BAS development includes a virtual engine dynamometer 22 with dual shaft extensions 24, 26 (uncoupled acceleration rate >20,000 RPM/sec), a parallel shaft high speed gearbox 28 (3:1 speed increase, >160 kW, shaft rotation lock, straight through shaft extensions), an e-motor headstock 30 (with fluid support, climatic chamber interface and adaption to e-motor), a BSG, alternator or other e-motor 32, and a power source 34 (vehicle battery system, DC power supply, or DC power with battery simulation). Note that any e-motor can include motor control power electronics as an integrated or separate enclosure. The test stand 20 also includes a transmission 36 (simulated or real; FWD, RWD or AWD; conventional or hybrid), shafting 38, and loading dynamometers 40, 42 that are capable of simulating road load of the target vehicle.

The shaft extension 26 is mechanically coupled to the gearbox 28. And the gearbox 28 is mechanically coupled to the BSG, alternator or other e-motor 32. The power source 34 provides power to the BSG, alternator or other e-motor 32. The shaft extension 24 is mechanically coupled to the transmission 36. And the transmission 36 is mechanically coupled to the shafting 38. Opposite ends of the shafting 38 are respectively mechanically coupled to the loading dynamometers 40, 42 such that the transmission 36 is mechanically between the loading dynamometers 40, 42. Torque and speed measurements can be taken with appropriate sensors at the interface between the gearbox 28 and BSG, alternator or other e-motor 32, the interface between the shaft extension 24 and transmission 36, the interface between the shafting 38 and loading dynamometer 40, and/or the interface between the shafting 38 and loading dynamometer 42.

Figure 3:
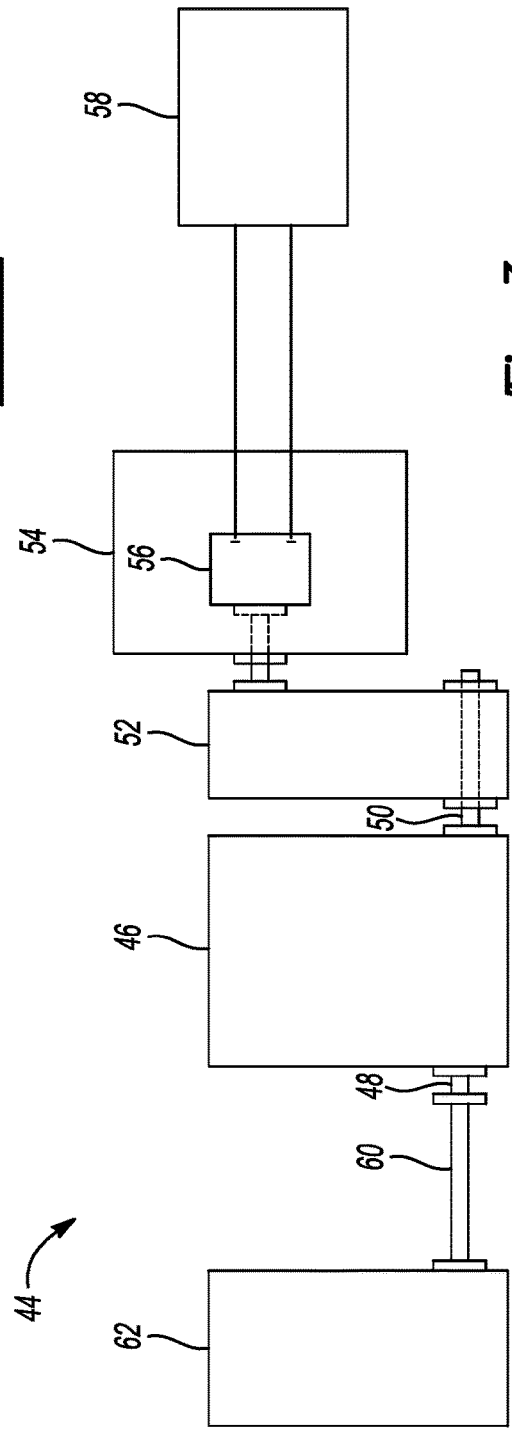
FIG. 3 is schematic diagram of another test stand for BSG/TARA/BAS development including a single cylinder research engine.

With reference to FIG. 3, an example test stand 44 for BSG/TARA/BAS development includes a virtual engine dynamometer 46 with dual shaft extensions 48, 50, a parallel shaft high speed gearbox 52, an e-motor headstock 54, a BSG, alternator or other e-motor 56, and a power source 58. The test stand 44 may also include shafting 60 and a SCRE 62 (low inertia connection). The shaft extension 50 is mechanically coupled to the gearbox 52. And the gearbox 52 is mechanically coupled to the BSG, alternator or other e-motor 56. The power source 58 provides power to the BSG, alternator or other e-motor 56. Opposite ends of the shafting 60 are respectively mechanically coupled to the shaft extension 48 and SCRE 62. Alternatively, the shafting 60 can be mechanically coupled to the gearbox 52 (instead of the shaft extension 48) at the other end of the shaft extension 48. Torque and speed measurements can be taken with appropriate sensors at the interface between the gearbox 52 and BSG, alternator or other e-motor 56, and/or the interface between the shaft extension 48 and shafting 60 (or the interface between the other end of the shaft extension 48 and shafting 60 as the case may be). Other arrangements are, of course, contemplated.

Figure 4:
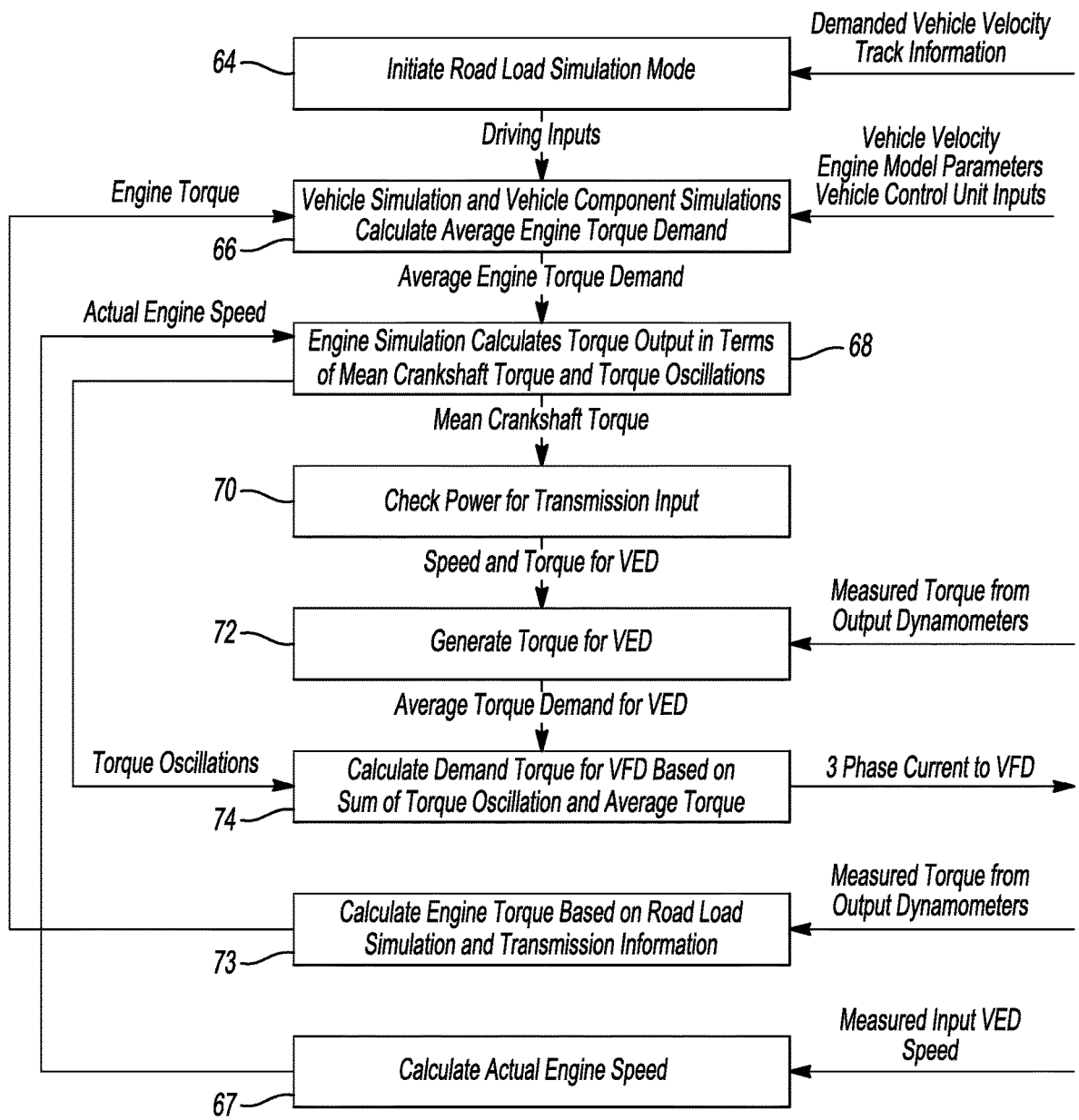
FIG. 4 is a flow chart of an algorithm for operating the test stand of FIG. 2.

With reference to FIGS. 2 and 4, the test stand 20 can be operated according to the following algorithm (which can be performed by the virtual engine dynamometer 22) such that desired speed oscillations are imparted to the electric motor 32 and desired torque oscillations are imparted to the drivetrain (e.g., transmission 36, shafting 38, etc.) At operation 64, a road load simulation mode is initiated, for example, in response to user input or other triggering event. This operation takes as input demanded vehicle velocity and track information such as road grade, road surface friction, road curvature, etc. Based on this input, driving inputs such as velocity profile, loading conditions, etc. are generated and output. (To the extent operations described herein perform various calculations and simulations, such are performed using known techniques and thus not discussed in great detail.) Vehicle simulation and vehicle component simulations, at operation 66, calculate average engine torque demand based on the output from operation 64 as well as vehicle velocity, which is based on (i) the simulated tire diameter and measured output speeds of loading dynamometers 40, 42, (ii) engine model parameters such as engine map and physical configuration of engine (e.g., 4 cylinder, 8 cylinder, fuel type, etc.), and (iii) vehicle control unit inputs such as parasitic losses from the alternator and air conditioning unit, ambient conditions, etc.

An actual engine speed (AES) is calculated at operation 67 as the product of a measured speed of the virtual engine dynamometer 22 (MSVED) and a quotient of the gear box ratio (GBR) and e-motor ratio (EMR). That is, AES=MSVED×(GBR/EMR). At operation 68, an engine simulation calculates torque output in terms of a mean crankshaft torque and torque oscillations based on the output of operations 66, 67. The mean crankshaft torque is then used to perform a transmission input power check at operation 70. That is, the power input to the transmission 36 (i.e., the actual torque applied) should be a function of the mean crankshaft torque and actual dynamometer speed—not necessarily the speed of the resultant vehicle simulation. And as a result, an output speed and torque for the virtual engine dynamometer 22 are generated. At operation 72, a torque for the virtual engine dynamometer 22 is generated via a PID control loop based on the output speed and torque resulting from operation 70 and measurements from physical driveline transducers associated with the loading dynamometers 40, 42.

At operation 73, an engine torque is calculated based on road load simulation and transmission information. A sum of the average torque demand from operation 72 and the torque oscillations output at operation 68 is used at operation 74 to calculate a demand torque for the variable frequency drive of the virtual engine dynamometer 22. This demand torque is expressed as a 3 phase current for the motor of the virtual engine dynamometer 22.

The torque oscillations used to calculate the 3 phase motor current will result in speed oscillations being imparted to the e-motor 32 because the gearbox 28 and transmission 36 share the motor shaft of the virtual engine dynamometer 22. This arrangement thus also results in (i) a frequency of the speed and torque oscillations increasing and an amplitude of the speed and torque oscillations decreasing to maintain power balance as a speed of the engine simulation increases, and (ii) an amplitude of the speed and torque oscillations increasing as a torque of the engine simulation increases.

Figure 5:
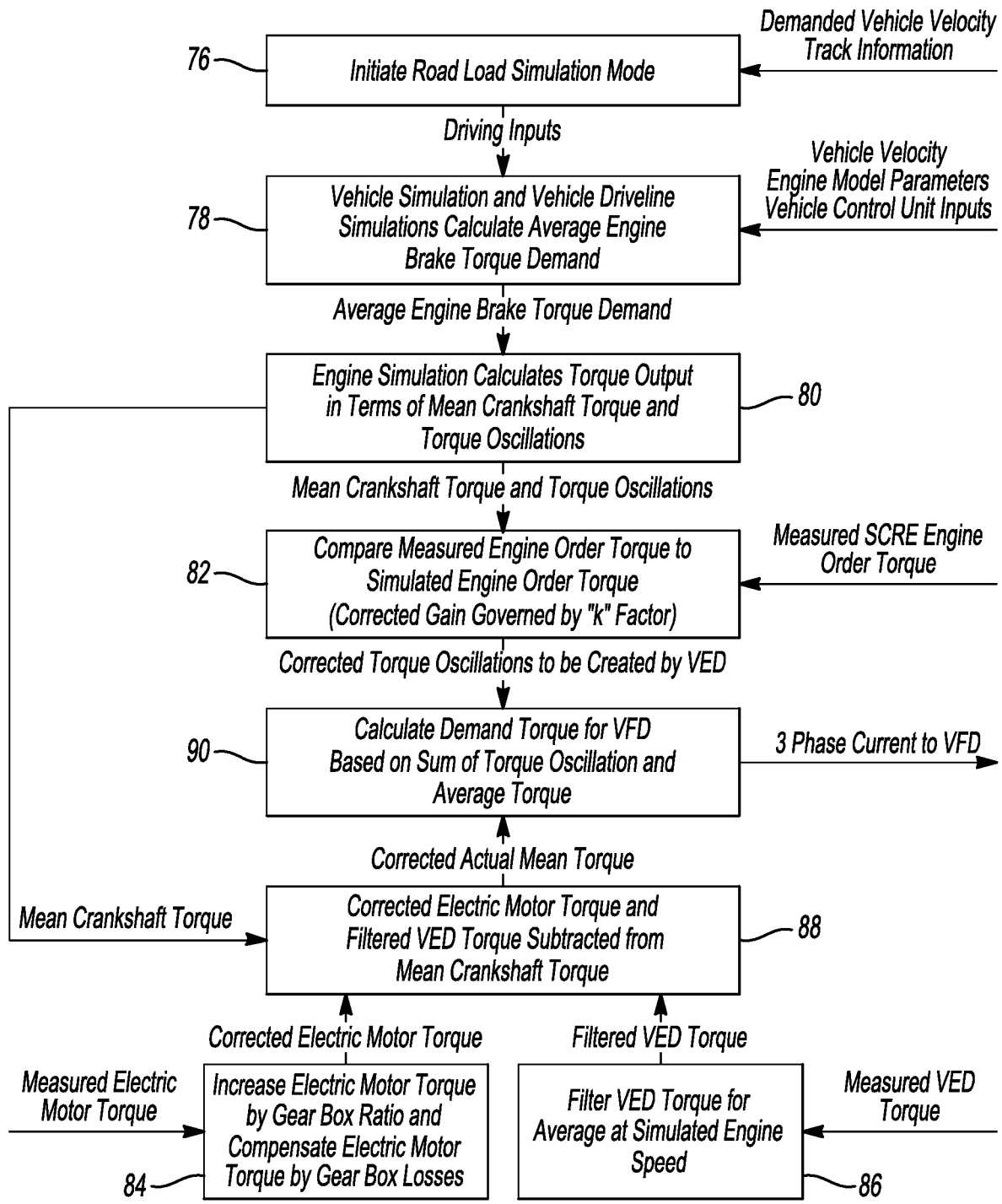
FIG. 5 is a flow chart of an algorithm for operating the test stand of FIG. 3.

With reference to FIGS. 3 and 5, the test stand 44 can be operated according to the following algorithm (which can be performed by the virtual engine dynamometer 46) such that desired speed oscillations are imparted to the electric motor 56 and desired torque oscillations indicative of operation of a multi-cylinder engine are imparted to the SCRE 62. At operation 76, a road load simulation mode is initiated, for example, in response to user input or other triggering event. This operation takes as input demanded vehicle velocity and track information such as road grade, road surface friction, road curvature, etc. Based on this input, driving inputs such as velocity profile, loading conditions, etc. are generated and output. Vehicle simulation and vehicle driveline simulations, at operation 78, calculate average engine brake torque (or mean torque) demand based on the output from operation 76 as well as vehicle velocity (which is based on (i) measured speeds of the virtual engine dynamometer 46 and (ii) vehicle driveline simulations), engine model parameters such as engine map and physical configuration of engine (e.g., 4 cylinder, 8 cylinder, fuel type, etc.), and vehicle control unit inputs such as parasitic losses from the alternator and air conditioning unit, ambient conditions, etc. At operation 80, an engine simulation calculates torque output in terms of mean crankshaft torque and torque oscillations based on the output of operation 78. Engine order torque measured from the SCRE 62 is received at operation 82 and compared with the simulated engine order torque output from operation 80. Here, a "k" factor is used to adjust the simulated torque oscillations to match the actual torque oscillations as known in the art. The resulting corrected torque oscillations to be created by the virtual engine dynamometer 46 are then output.

At operation 84, torque measured from the BSG, alternator or other e-motor 56 is increased by the ratio of the gear box 52 and compensated for by the losses of the gear box 52. The resulting corrected electric motor torque is then output. At operation 86, torque measured from the virtual engine dynamometer 46 is filtered for average at the simulated engine speed, and the resulting filtered virtual engine dynamometer torque is then output. The corrected electric motor torque and filtered virtual engine dynamometer torque from operations 84, 86 respectively are subtracted from the mean crankshaft torque from operation 80 to generate a corrected actual mean torque. A sum of the corrected torque oscillations from operation 82 and the corrected actual mean torque from operation 88 is used to calculate a demand torque for the variable frequency drive of the virtual engine dynamometer 46. This demand torque is expressed as a 3 phase current for the motor of the virtual engine dynamometer 46.

The gearbox 52 and SCRE 62 effectively share the motor shaft of the virtual engine dynamometer 46. As such, altering a speed and torque of the dual shaft extensions 48, 50 based on the speed and torque of the SCRE 62 imparts speed oscillations into the e-motor 56 and torque oscillations into the SCRE 62.

Figure 6:
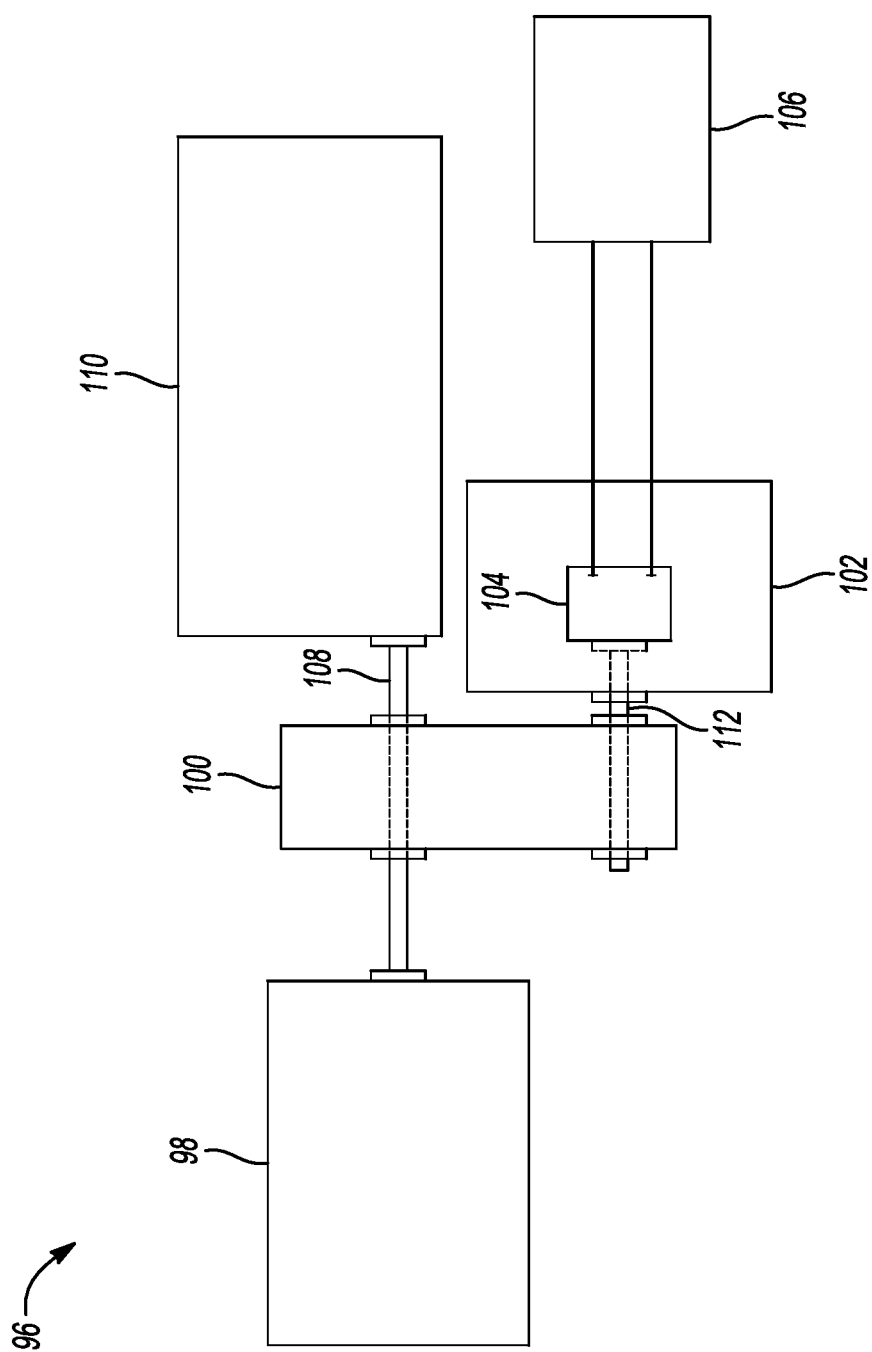
FIG. 6 is a schematic diagram of yet another test stand for BSG/TARA/BAS development including an internal combustion engine on an engine pallet.

With reference to FIG. 6, an example test stand 96 for BSG/TARA/BAS development includes a loading dynamometer 98 (with road load and transmission simulations), a parallel shaft high speed gear box 100 (3:1 speed increase, >160 kW, shaft rotation lock, straight through shaft extensions), an e-motor headstock 102 (with fluid support, climatic chamber interface and adaption to e-motor), a BSG, alternator or other e-motor 104, and a power source 106 (vehicle battery system, DC power supply, or DC power with battery simulation. Note that any e-motor can include motor control power electronics as an integrated or separate enclosure.

Low speed pass through shafting 108 of the gearbox 100 mechanically couples the loading dynamometer 98 to an engine 110 (e.g., an internal combustion engine on an engine pallet with "dyno" operation set up). High speed shafting 112 of the gearbox is mechanically coupled to the BSG, alternator or other e-motor 104.

Speed measurements may be taken with appropriate sensors on the end of the loading dynamometer 98 opposite the low speed shafting 108, the end of the high speed shafting 112 opposite the BSG, alternator or other e-motor 104, and at the low speed shafting 108 between the gear box 100 and engine 110. Torque measurements may be taken with appropriate sensors at the low speed shafting 108 between the loading dynamometer 98 and gear box 100, at the low speed shafting 108 between the gear box 100 and engine 110, and at the high speed shafting 112 between the gear box 100 and the BSG, alternator or other e-motor 104.

The arrangement 96 permits the engine 110, which does not otherwise have fittings to be directly connected to the BSG, alternator or other e-motor 104, to nevertheless be mechanically coupled to the BSG, alternator or other e-motor 104 via the gearbox 100 and associated shafting 108, 112. As such, engine calibration efforts, in as far as they concern effects of the BSG, alternator or other e-motor 104, can be performed.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A dynamometer system comprising:
a prime mover dynamometer including a primary output mechanically coupled to a drivetrain, a secondary output having a fixed speed relationship with the primary output, and a controller; and
a gearbox mechanically coupled to the secondary output and mechanically coupled to an electric motor, wherein the controller is programmed to alter a speed and torque of the outputs based on a calculated speed and torque associated with a simulated internal combustion engine to impart speed oscillations into the electric motor via the gearbox and to impart torque oscillations into the drivetrain, and wherein the drivetrain and simulated internal combustion engine represent a vehicle powertrain.

2. The system of claim 1, wherein the prime mover dynamometer and gearbox are arranged such that as a speed of the simulated internal combustion engine increases, a frequency of the speed and torque oscillations increases and an amplitude of the speed and torque oscillations decreases to maintain power balance.

3. The system of claim 1, wherein the prime mover dynamometer and gearbox are arranged such that as a torque of the simulated internal combustion engine increases, an amplitude of the speed and torque oscillations increases.

4. The system of claim 1, further comprising an environmental chamber configured to contain the electric motor but not the prime mover dynamometer.

5. A method for controlling a dynamometer comprising:
altering by a controller a speed and torque of a prime mover dynamometer primary output coupled to a drivetrain and a prime mover dynamometer secondary output that has a fixed speed relationship with the prime mover dynamometer primary output based on a calculated speed and torque associated with a simulated internal combustion engine to impart speed oscillations into an electric motor coupled to the prime mover dynamometer secondary output via a gearbox and to impart torque oscillations into the drivetrain.

6. The method of claim 5, wherein the altering is such that as a speed of the simulated internal combustion engine increases, a frequency of the speed and torque oscillations increases and an amplitude of the speed and torque oscillations decreases to maintain power balance.

7. The method of claim 5, wherein the altering is such that as a torque of the simulated internal combustion engine increases, an amplitude of the speed and torque oscillations increases.

8. A dynamometer system comprising:
a prime mover dynamometer including a primary output coupled to a drivetrain, a secondary output having a fixed speed relationship with the primary output, and a controller; and
a gearbox coupled to the secondary output and coupled to an electric motor, wherein the controller is programmed to alter a speed and torque of the outputs based on a calculated speed and torque associated with a simulated internal combustion engine to impart speed oscillations into the electric motor and to impart torque oscillations into the drivetrain.

9. The system of claim 8, wherein the prime mover dynamometer and gearbox are arranged such that as a speed of the simulated internal combustion engine increases, a frequency of the speed and torque oscillations increases and an amplitude of the speed and torque oscillations decreases to maintain power balance.

10. The system of claim 8, wherein the prime mover dynamometer and gearbox are arranged such that as a torque of the simulated internal combustion engine increases, an amplitude of the speed and torque oscillations increases.

11. The system of claim 8, further comprising an environmental chamber configured to contain the electric motor but not the prime mover dynamometer.

* * * * *